July 17, 1962 W. H. NEELY 3,044,831
WIRE SPRING STRUCTURE
Filed Oct. 29, 1959 6 Sheets-Sheet 1

INVENTOR.
WILLIAM H. NEELY
BY
Gustav A. Wolff
ATT

July 17, 1962 W. H. NEELY 3,044,831
WIRE SPRING STRUCTURE
Filed Oct. 29, 1959 6 Sheets-Sheet 2
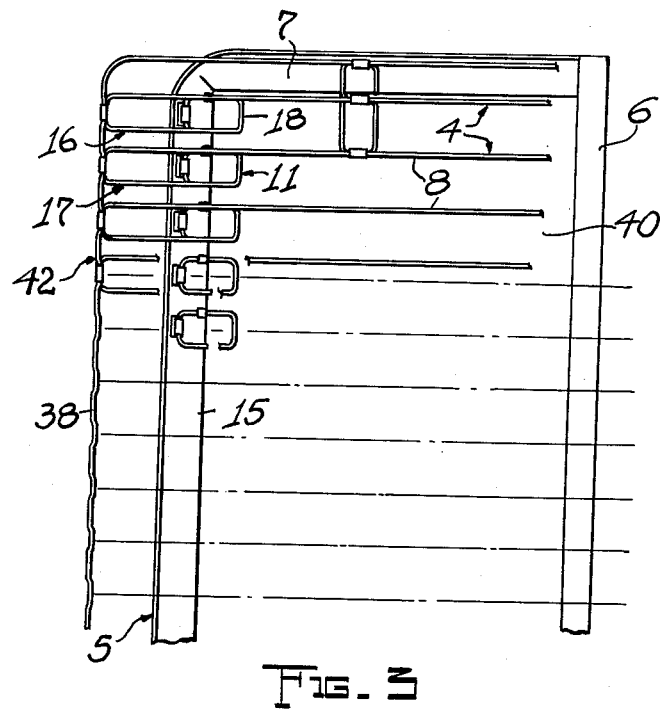
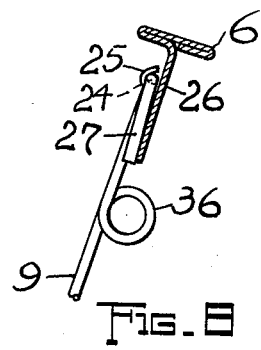
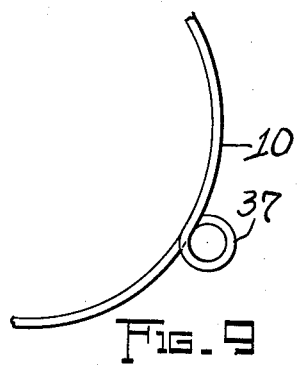
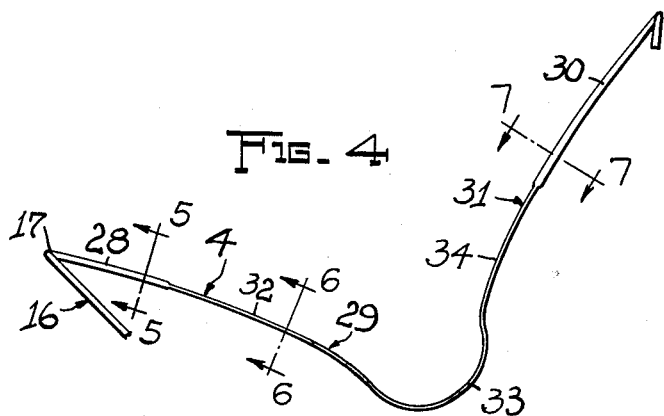
INVENTOR.
WILLIAM H. NEELY
BY
ATT.

July 17, 1962
W. H. NEELY
3,044,831
WIRE SPRING STRUCTURE
Filed Oct. 29, 1959
6 Sheets-Sheet 3
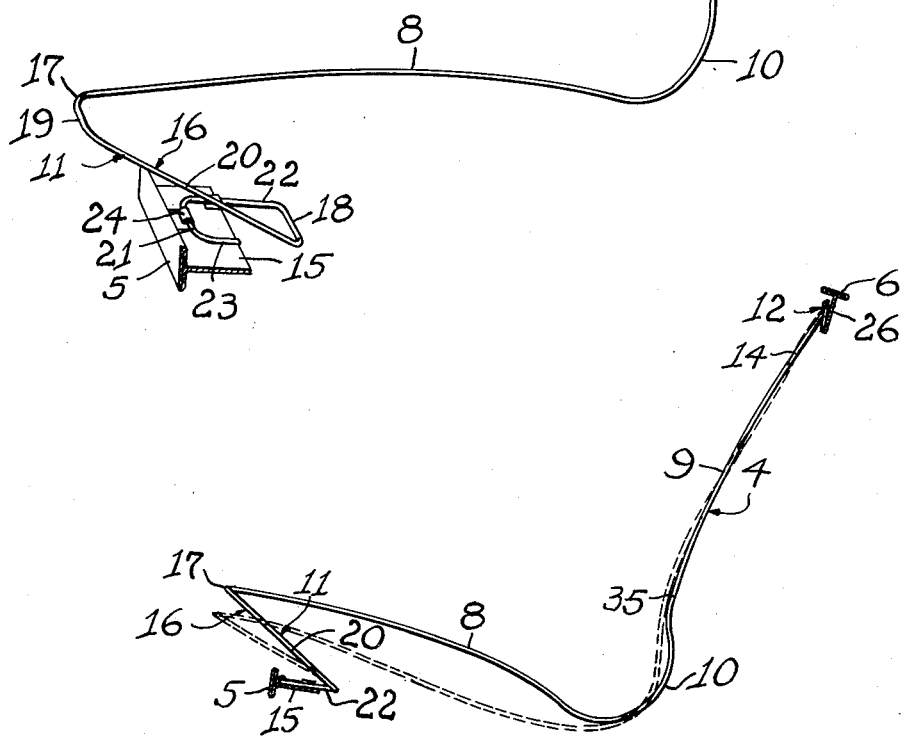
Inventor
WILLIAM H. NEELY
By
/Attorney

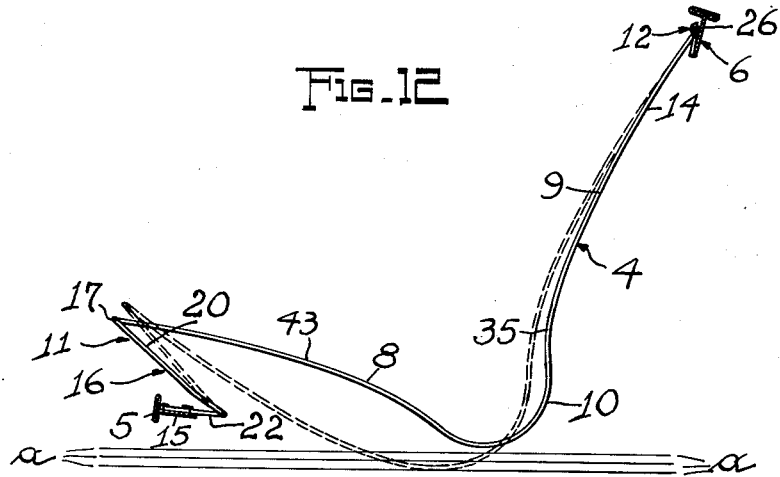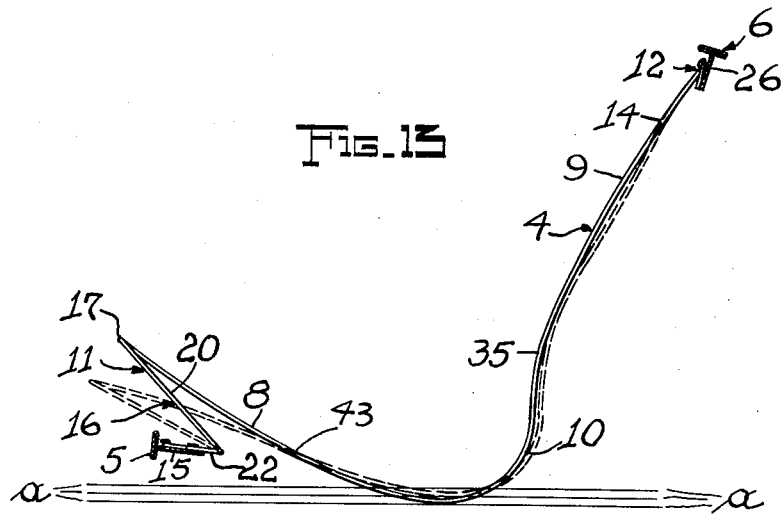

July 17, 1962

W. H. NEELY 3,044,831

WIRE SPRING STRUCTURE

Filed Oct. 29, 1959

Inventor
WILLIAM H. NEELY
By Gustav A. Wolff
Attorney

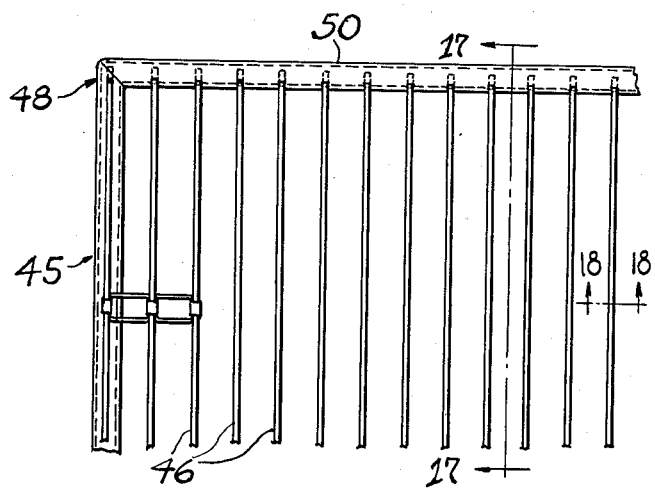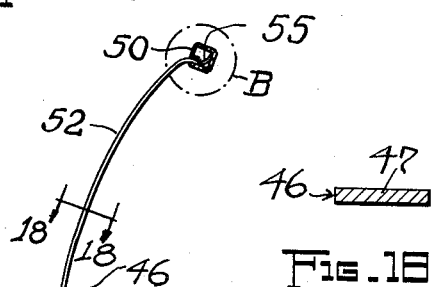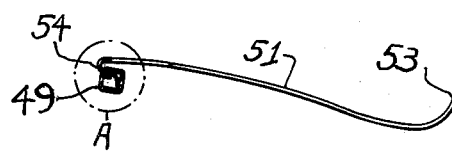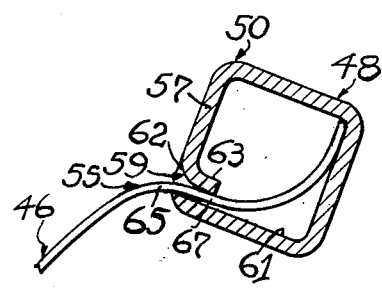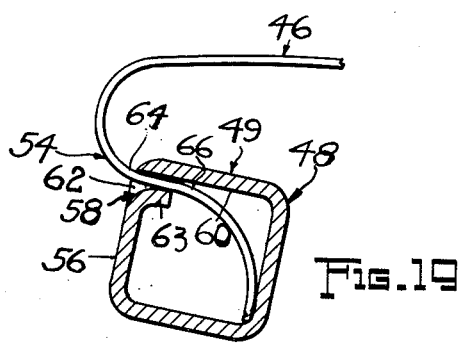

United States Patent Office 3,044,831
Patented July 17, 1962

3,044,831
WIRE SPRING STRUCTURE
William H. Neely, Cleveland, Ohio, assignor, by mesne assignments, to Hoover Ball & Bearing Co., Saline, Mich., a corporation of Michigan
Filed Oct. 29, 1959, Ser. No. 849,688
4 Claims. (Cl. 297—454)

This invention relates in general to wire spring elements and, more particularly, to improved wire spring elements for upholstered wire spring constructions and is a continuation in part of my pending application Ser. No. 705,282 filed December 26, 1957, now abandoned.

Styling appearance has now become a factor of ruling importance in the automotive industry. As automobiles have been restyled lower and lower, and as engineers have developed more mechanical variations affecting frame and body shape, the seating problem has become increasingly difficult. As the roofs of cars are lowered, as the transmissions are moved adjacent the rear axles, and as new air chassis suspensions and other mechanical innovations are adopted by the automotive industry for advanced performance purposes, less space is available for seating the passengers with adequate comfort through the mere use of prior known seat structures, such as zig-zag spring units of the type typically disclosed in my Patent 2,280,840.

The lowering of car roofs by automotive stylists, and the increasing use by vehicle engineers of sharply angled ramps, large tunnels, and other irregular configurations extending upwardly into the floor pans to accommodate novel transmissions, suspensions and the like, has resulted in extreme reductions in the available inside space for static seating with little or no "extra" space for absorbing shock loading.

In order to achieve comfortable static seating within an automobile there should be sufficient inside space available to permit the spring surfaces and the supporting padding and upholstery to deflect for load support. There must be a minimum necessary spring deflection space for adequate total cushion and back penetration, under seating load pressures low enough to maintain reasonable body comfort, and at the same time there must also be still further free deflection space available to absorb shock load penetrations. It should be recognized, therefore, that any new concept in automobile seating must provide adequate seating comfort under both static and shock load conditions with relatively thin cushion and back structures; must provide rear seat foot room despite floor pan conformation and obstructions; and must achieve full shock load absorption and continuous dampening within a minimum available space.

It is the primary purpose of this invention to provide an entirely new preformed wire spring element constructed to furnish flexible foundations for combined seat and back rest spring structures assembled from preformed wire spring elements, in which structures the preformed wire spring elements are arranged side by side, having their backrests suspended from supports disposed above the wire spring elements and having their seat front ends mounted in forwardly overhanging relation on other supports disposed below the wire spring elements in laterally offset relation with respect to the first supports, thereby to increase load supporting contact of the seat and back rests of the wire spring elements for wide distribution thereon of loading forces, to decrease normal load and shock load deflections of the spring seats and back rests, and to adapt the combined seat and back rest spring structures to present-day automobile styling.

The general object of the invention is the provision of an integral, preformed wire spring element of round or flat wire embodying a yielding elongated seat and a yielding elongated back rest connected with each other by a curved sweep, the wire spring element including rearwardly and downwardly extended supporting means at the seat front end, permitting yielding mounting of the wire spring element in forwardly overhanging elevated position on a support, and including attaching means near the top of the back rest, permitting suspension of the wire spring element from another support arranged in vertically and laterally offset relation with respect to the first support.

Wire spring elements supported in the manner described above attain fore and aft and vertical stability by the forwardly overhanging, elevated mounting of their seats and by the suspension of their back rests, and effect proper seating under substantially all load conditions by cooperation of the seats and back rests, a cooperation which is controlled by the shape of the connecting areas between the seats and back rests and the particularly coordinated shape of the seats and back rests.

Another object of the invention, therefore, is the provision of a preformed wire spring element including a flexible, resilient seat having a rearwardly and upwardly curved sweep at its rear end, a yielding back rest extended upwardly from the curved sweep of the seat, rearwardly and downwardly extended supporting means permitting yielding, resilient mounting of the wire spring element at its front end in forwardly overhanging, elevated position on a support for fore and aft stability, and attaching means near the top of the back rest permitting suspension of the wire spring element from a support for vertical stability.

A wire spring element of the type described, supported in the manner referred to, effects a hugging support of an occupant's back under normal and shock loads, and, particularly, effects increased hugging engagement and support of the lower part or "small" of an occupant's back by a pronounced "bow" preformed in the lower portion of the back rest and extended opposite the corresponding inward curvature or "hollow" of an occupant's back, and which hugging support is readily controlled by predetermined rearward offsetting of the curved sweep of the wire spring element to avoid excessive hugging of the wire under normal load and to increase such hugging action under shock load.

A further object of the invention, therefore, is the provision of a preformed wire spring element of the type described, wherein the back rest includes in the lower part thereof a pronounced forwardly extended bowed area arranged to substantially extend opposite the hollow of an occupant's back, and wherein the curved sweep is rearwardly offset to decrease at normal loads the hugging action of the curved sweep and at shock loads increase such hugging action to effect under all load conditions proper hugging support of an occupant.

Still another object of the invention is the provision of a preformed wire spring element of substantially L-shaped form including a horizontally arranged, upwardly bowed seat, a vertically arranged, forwardly curved back rest, a rearwardly curved connecting area between the seat and back rest extended in rearwardly offset relation with respect to the back rest and merging on sweeping lines into the seat and back rest, and supporting and suspension means at the front of the seat and the top of the back rest.

A still further object of the invention is the provision of a preformed wire spring element of the type referred to, including in the lower part of the forwardly curved back rest a bowed area arranged to extend substantially opposite the hollow of the back of an occupant.

Still another object of the invention is the provision of a plurality of integrally shaped, preformed wire spring elements of round or flat wire mounted side by side on frame means to provide a seating construction, wherein each element is of substantially L-shaped form having a substantially horizontally arranged, upwardly bowed seat including at its front end downwardly and rearwardly inclined supporting means and having at its rear end a rearwardly and upwardly extended curved sweep, and a substantially vertically arranged, outwardly bowed back rest including at its top end attachment means and having at its lower end a forwardly extended bow arranged to be positioned opposite the hollow of the back of an occupant of the seating construction, said forwardly extended bow being forwardly extended with respect to the curved sweep of the seat and merged thereinto.

A still further object of the invention is the provision of an integrally shaped, preformed wire spring element of the type described, wherein the wire forming the wire spring element in predetermined areas thereof differentiates in shape and form of the cross section of the wire of the wire element to control in predetermined areas elastic reaction of the wire spring under load.

Still another object of the invention is the provision of an integrally shaped, preformed wire spring element of the type described above, wherein the downwardly and rearwardly inclined supporting means at the front end of the seat include at the upper end a cross bar to torsionally connect the supporting means with the seat.

With the above and other objects in view, the invention has certain other marked superiorities which clearly distinguish it from presently known structures and arrangement of this type. These improvements or characteristics embodying certain novel features of construction and design are clearly set forth in the appended claims and the preferred forms of embodiment of the invention hereinafter shown with reference to the accompanying drawings forming part of the specification.

In the drawings:

FIG. 3 is a fragmentary plan view of the wire spring construction shown in FIG. 1 taken on line 3—3 of FIG. 1.

FIG. 4 is a fragmentary view of a somewhat modified wire spring element having in different areas different shape of the cross section of the wire of the wire spring element.

FIG. 5 is an enlarged cross sectional view taken on line 5—5 of FIG. 4.

FIG. 6 is an enlarged cross sectional view taken on line 6—6 of FIG. 4.

FIG. 7 is an enlarged cross sectional view taken on line 7—7 of FIG. 4.

FIG. 8 is an enlarged fragmentary side view of the top portion of a somewhat modified form of wire spring element.

FIG. 9 is an enlarged fragmentary side view of the rearwardly and upwardly extended curved sweep of another somewhat modified form of wire spring element.

FIG. 10 is a perspective view of an integrally shaped wire spring element supported by lower and upper, laterally spaced supporting means.

FIG. 11 is a side view of an integrally shaped wire spring element supported by lower and upper, laterally spaced supporting means, indicating the wire spring element unloaded in solid lines and loaded in dotted lines.

FIG. 12 is a side view similar to FIG. 11, indicating the wire spring element unloaded in full line and loaded with a concentrated seat load in dotted line.

FIG. 13 is a side view similar to FIG. 12, indicating the wire spring element when loaded with a concentrated seat load in full line and subjected to a shock load in dotted line.

FIG. 16 is a fragmentary front view of a wire spring construction assembled from wire spring elements formed of flat wire.

FIG. 17 is a cross sectional view on line 17—17 of FIG. 16 showing one of the wire spring elements connected to front and top rails of the wire spring construction.

FIG. 18 is an enlarged cross section taken on line 18—18 of FIG. 17.

FIG. 19 is an enlarged fragmentary view of the front portion of FIG. 17 as marked by A in said figure.

FIG. 20 is an enlarged fragmentary view of another portion of FIG. 17 as marked by B in said figure.

Figure 1:
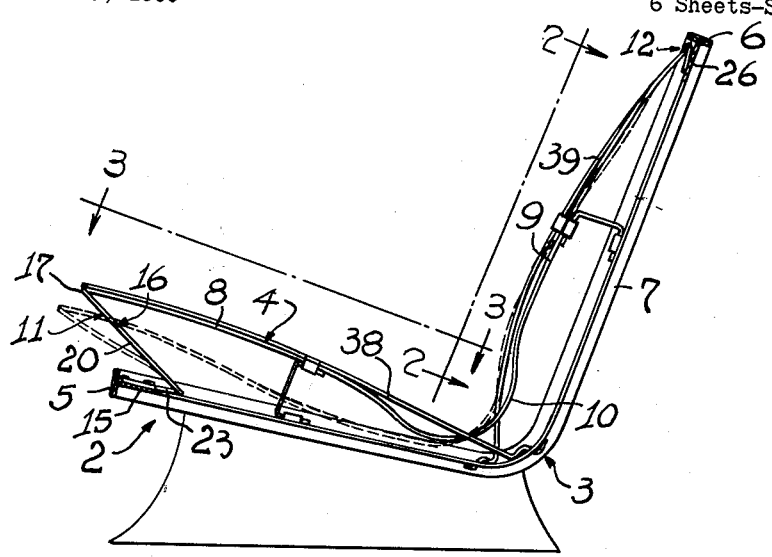
FIG. 1 is a transversal sectional view through a wire spring construction assembled from wire spring elements according to the invention, indicating the wire spring elements unloaded in solid lines and loaded in dotted lines.
Figure 2:
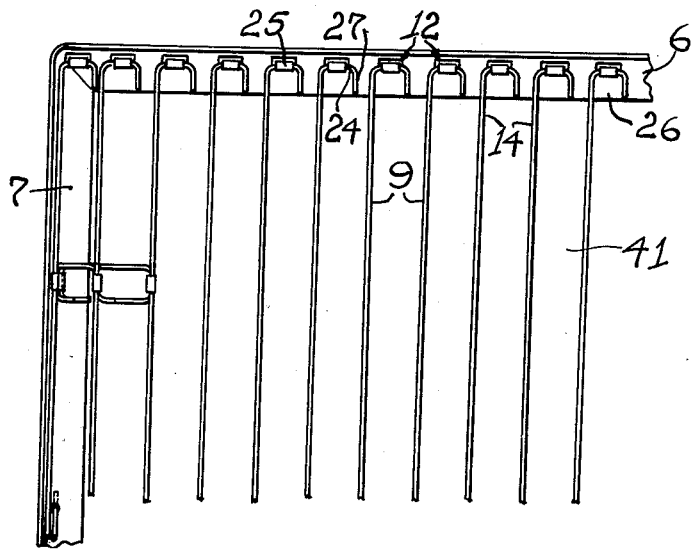
FIG. 2 is a fragmentary front view of the wire spring construction shown in FIG. 1 taken on line 2—2 of FIG. 1.

Referring now more particularly to the seat spring construction shown in the drawings, reference numeral 2 denotes generally a seat spring construction embodying an open frame or supporting means 3 mounting a plurality of wire spring elements 4. Frame 3 includes a lower rail 5 and an upper rail 6 vertically and laterally offset with respect to each other and connected to each other by L-shaped side arms 7.

Frame 3 serves to mount a plurality of wire spring elements 4 in substantially parallel side by side relation, crosswise thereof. The wire spring elements 4 are each integrally shaped from straight, resiliently bendable steel wire of a cross section determined by practical considerations, such as the spacing of the wire elements and their desired load strength and resiliency to be of about eleven to fourteen wire gage. Each wire spring element 4 includes an elongated seat 8; an elongated back rest 9; a rearwardly and upwardly curved sweep 10 merging at its opposite ends into seat 8 and back rest 9; front end supporting and attaching means 11 for seat 8, constructed to support the seat front end in forwardly overhanging, elevated position on lower rail 5; and suspending and attaching means 12 at the upper end 14 of the back rest 9, arranged to suspend the wire spring element 4 from upper rail 6.

Elongated seat 8 of wire spring element 4 is slightly upwardly curved to provide rearward yieldability in response to load forces by an occupant's body and to permit proper functioning of the overhanging front supporting arrangement which absorbs under normal seating and shock loading only a limited portion of the total load, it being important to retain yield and pliability at the front of the seat, especially for proper seating comfort within the reduced interior space of present day automobiles.

Each wire spring element 4 has its seat 8 mounted on web 15 of lower rail 5 by a straight wire, generally V-shaped lever 16 rearwardly and downwardly extended from front end 17 of elongated seat 8. The lever 16 includes a wire cross member 18, forming a sharp-edged apex, a connecting wire cross member 19 at the upper end of a lever arm 20, and a wire cross member 21 at the free end of a lever arm 22 attached to web 15 in substantially cantilever-like fashion by engagement of a wire cross member 21, having a short angular extension 23, and attached to a hook-shaped, struck-up portion 24 of the web 15. This connection of lever arm 22 to lower rail 5, and the yieldability of lever 16 in response to seating loads, enables an arcuate movement of the seat front end 17 to various positions of balanced response to the normal or static seating load and to shock loads, whereby an effective fore and aft stability of wire spring element 4 is achieved. Elongated back rest 9 is slightly forwardly curved and has suspending and attaching means 12 connected to back rest 9 by wire cross member 24 at upper end 14 of the back rest, which wire cross member is pivoted to a tongue-like struck-up portion 25 of web 26 of upper rail 6 and includes a lateral extension 27 angularly related to the axis of back rest 9 to yieldingly force the back rest in a direction away from web 26.

Elongated seat 8 and elongated back rest 9 of each wire spring element are connected with each other by a rearwardly and upwardly extended sweep 10 of substantial arcuate length merging or blending with seat 8 and back rest 9. Bending or opening movement of the wire spring element 4 at the zone of interconnection formed by the sweep 10 is distributed over a substantial length or arc, thereby contributing to a movement of the spring seat construction toward effective hugging support of the body load in full conformity with the body load shape. Proper load response of the cooperating seat 8, back rest 9 and connecting sweep 10 is facilitated and may be predetermined by differentiating the shape of the cross section of the wire of wire spring element 4 as shown in FIG. 4, in which front portion 28 of seat 29 and upper portion 30 of back rest 31 have circular wire cross section, and rear portion 32 of seat 29, sweep 33 and lower portion 34 of back rest 31 have elongated, substantially rectangular wire cross section.

Wire spring element 4 with rearwardly and upwardly curved sweep 10 wraps tightly against an occupant's body only when the wire spring element is exposed to shock loads and when shock load travel should be limited. This action is caused by the provision of a pronounced forwardly bowed portion 35 in the lower portion of forwardly curved back rest 9. Under normal load the curved sweep 10 effects a relatively gentle, yielding response to and conformity with the load shape, and under shock load effects an immediate and substantial "opening up" of the arc of curvature sweep to more closely conform to the increased load force being impressed by the shape of an occupant's body. Such opening up and wrapping against the load shape by the sweep 10, while momentarily increasing hugging contact with an occupant's body, is so uniform and balanced as to not be objectionable or particularly noticeable.

Suspension of wire spring element 4, effected by spring-controlled pivotal mounting as described, frees fore and aft movement of back rest 9 by torsional twisting of wire cross member 24, and may be made more pliable by a rearwardly extended loop portion 36 arranged near the upper end of back rest 9 (see FIG. 8). In addition, action and reaction of curved sweep 10 may be made more smooth and uniform by arrangement of a loop portion 37 (see FIG. 9) in sweep 10, such loop portions being extended rearwardly of wire spring element 4 to prevent interference with proper seating comfort.

Wire spring elements 4 are connected to each other by U-shaped edge wire members 38, 39, U-shaped wire member 38 forming the border wire for seat area 40 of seat spring construction 2 and U-shaped edge wire member 39 forming the border wire for back rest area 41.

A seat spring construction of the type described, which mounts its generally L-shaped wire spring elements 4 on a generally L-shaped frame 3 by supporting the front portions of seat 8 in overhanging, cantilever-like fashion upon the horizontal branch or lower rail 5 of the L-shaped frame and suspending back rests 9 from the vertical branch or upper rail 6 of the L-shaped frame 3, provides seating area 40 with a yielding front end 42, insures fore, aft and vertical stability of wire spring element 4, and effects cooperative load action of their "suspended" seats 8 and back rests 9 for huggingly supporting an occupant by counteractingly responding to substantial areas of the body load shape, including particularly the hollow part of the back of the occupant, while eliminating excessive localized stresses in wire spring elements 4 under normal and shock loads.

Action of seat spring construction 2 in unloaded, fully loaded and shock loaded condition is best understood by reference to FIGS. 11 through 13, wherein the wire spring element 4 is mounted on frame 3 in the manner previously described. Wire spring element 4 is shown in FIG. 11 in its installed, unloaded condition in full lines, and in its fully loaded condition in dotted lines, indicating straightening out of the wire spring element when loaded, the forwardly curved back rest 9 being flattened, curved sweep 10 being opened up, and seat 8 being lowered.

FIGS. 12 and 13 disclose the reaction of wire spring element 4 under concentrated loading of middle portion 43 of seat 8, and under shock loading of the spring element, respectively. In FIG. 12, the wire spring element 4 is shown in installed, unloaded condition in full lines, and the shape of wire spring element 4 when subjected to concentrated loading of middle portion 43 is shown in dotted lines, all as indicated with respect to generally horizontal planes or reference lines a—a. In FIG. 13, the shape of wire spring element 4 is shown subjected to concentrated loading of middle portion 43 in full lines, and the shape of wire spring element when 4 subjected to shock loadings is shown in doted lines, all as indicated with respect to reference lines a—a. It will be noted that middle portion 43 is less deformed by shock loading than by concentrated loading, which is due to better distribution of loads and shock loads over wire spring element 4, resulting in a better load distribution in seat 8 and back rest 9.

Figures 14, 15:
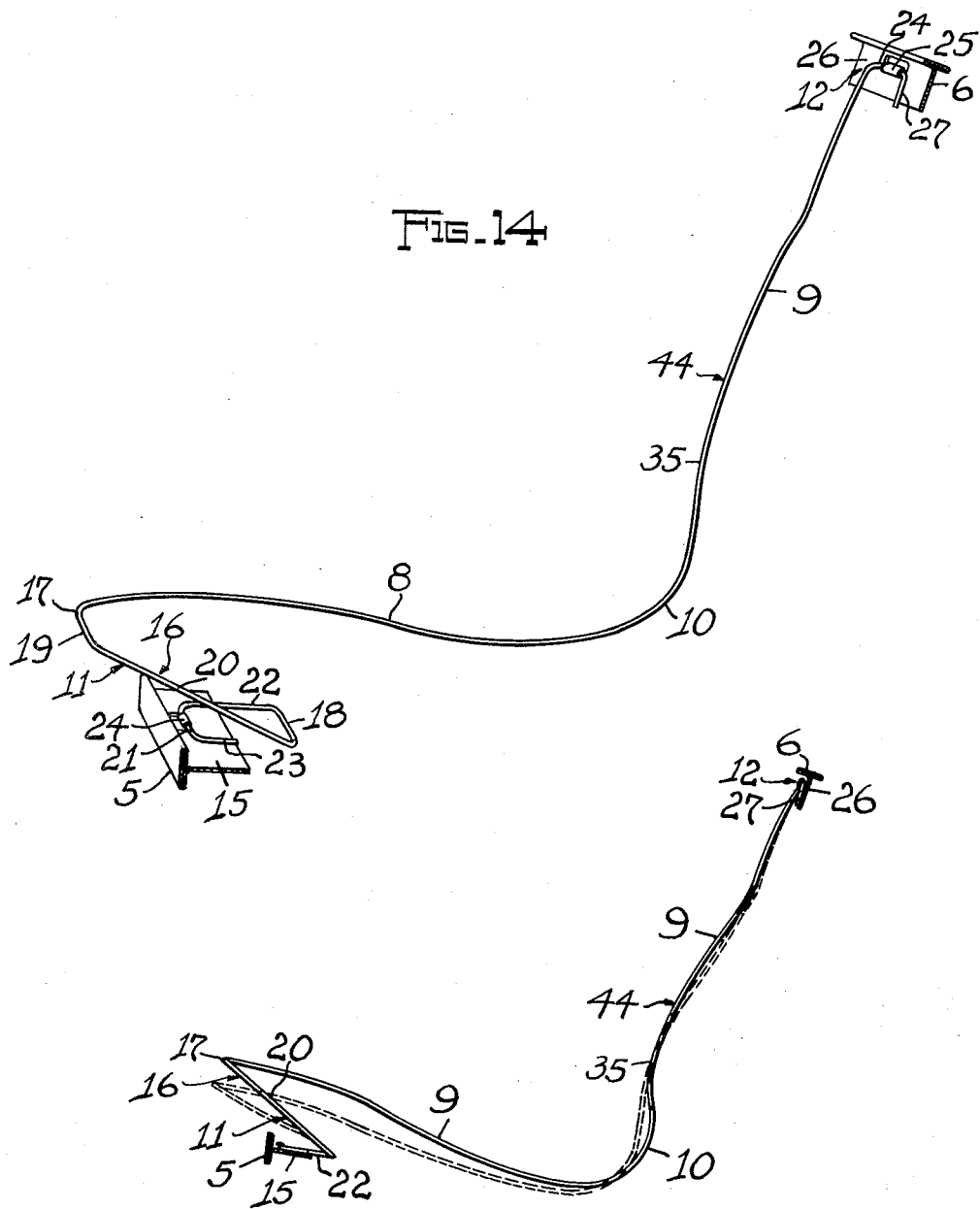
FIG. 14 is a perspective view of a somewhat modified integrally shaped wire spring element supported by lower and upper laterally spaced supporting means.
FIG. 15 is a side view of the integrally shaped form of wire spring element shown in FIG. 14, indicating the wire spring element normally loaded in solid line and shock loaded in dotted line.

FIGS. 14 and 15 disclose the shape and form of a somewhat modified wire spring element 44, the preformed shape of which approaches more closely the shape of an occupant's body. FIG. 14 shows a perspective view of preformed wire spring element 44 mounted on frame 3 in the manner previously described; and FIG. 15 shows the shape of the preformed wire spring element 44 in installed, unloaded condition in full lines and the load shape of such wire spring element in dotted lines, the load shape being substantially the shape of loaded wire spring element 4 disclosed in FIG. 11. Although preshaped wire spring elements 44 in loaded condition are generally less deformed than wire spring elements 4, but preformed wire spring elements require the use of special means for attaching upholstery to the wire spring elements.

FIGURES 16 through 20 show a wire spring construction 45 of the general type previously disclosed with the exception that wire spring elements 46 are made of flat wire stock having the cross section 47 shown in FIG. 18. Frame 48 of wire spring construction 45 is of substantially tubular cross section and includes a lower tubular rail 49 and an upper tubular rail 50 vertically and laterally offset with respect to each other.

Frame 48 removably mounts a plurality of wire spring elements 46 in substantially parallel side by side relation, crosswise thereof. The wire spring elements 46 are each integrally shaped from flat, straight, resiliently bendable steel wire and each includes an elongated seat 51, an elongated back rest 52; a downwardly, rearwardly and upwardly curved sweep 53 merging at its opposite ends into seat 51 and back rest 52, front end supporting and attaching means 54 for seat 51 and suspending and attaching means 55 at the upper end of back rest 52, arranged to suspend the wire spring element 46 from upper tubular rail 50.

As shape and reaction of spring elements 46 are substantially the same as previously described spring elements 4 no further detailed description is deemed necessary, with the exception of the mounting of spring elements 46 on tubular lower and upper rails 49 and 50 more specifically described hereinafter.

Proper mounting of spring elements 46 on upper tubular rails 49 and 50 is effected by arranging in front walls 56, 57 of the rails slot and tongue arrangements 58, 59 by slitting walls 56 and 57 on U-shaped lines adjacent to inner faces 60, 61 of said walls and bending the slit portions of the walls into rails 49, 50 thus providing the rails with slots 62 and elongated supports 63 extended from the one edges of the slots into frame rails 49, 50 at right angles to front walls 56, 57.

Wire spring elements 46 have their ends 64, 65 shaped to supporting and attaching means 54 and suspending and attaching means 55 by bending said ends to S-shaped and inverted S-shaped configurations 66, 67 and lower and upper tubular rails 49, 50 have their front walls 56 and 57 slitted to give front wall 56 slot and tongue arrangements 58 at the upper portion of wall 56 and front wall 57 slot and tongue arrangements 59 at the lower portion of wall 57.

The described S-shaped and inverted S-shaped configurations 66, 67 properly attach wire springs 46 to tubular rails 49 and 50 and permit ready assembly and disassembly of wire springs 46 to and from the tubular rails 49, 50.

Having thus described my invention, what I claim is:

1. A wire spring element for seat spring constructions comprising elongated resilient wire means formed to provide a resiliently bendable seat portion, a downwardly, rearwardly and upwardly extended curved sweep and a resiliently bendable wire back rest portion extending upwardly from the curved sweep of the seat portion in forwardly extended relation with respect thereto, said back rest portion including, immediately above the curved sweep, a forwardly bowed portion arranged to approach the hollow portion of the small of an occupant's back when the spring element is loaded, and attaching means at the free ends of the wire means for suspending said element deformably throughout its length between said ends, the said back rest portion including near its upper end immediately below the attached portion a rearwardly extended loop portion.

2. In a seat spring construction the combination of an upper supporting rail and a lower supporting rail vertically spaced and laterally offset with respect to each other, and a wire spring element integrally formed of straight wire secured only at its ends to said supporting rails, said wire spring element including a generally horizontal, upwardly curved elongated straight wire seat provided at its rear end with a downwardly, rearwardly and upwardly extended curved sweep and a generally vertical, elongated straight wire back rest extending upwardly from said sweep in forwardly extended relation with respect thereto, said back rest including, immediately above the curved sweep, a forwardly bowed portion arranged to approach the hollow portion of the small of an occupant's back when the spring element is loaded, said wire spring element having its front end in substantially overhanging position in cantilever-like fashion attached to the lower supporting rail and its back rest directly suspended from the upper supporting rail to attain vertical stability causing the wire seat of the wire spring element to be moved forwardly and downwardly by loads applied thereto, and the curved sweep to be moved forwardly by such applied loads, said curved sweep including a rearwardly extended loop portion for controlling the resilient load response of the curved sweep.

3. In a seat spring construction which includes a supporting frame having an upper rail and a lower rail spaced below and forwardly of said upper rail, a plurality of wire spring elements supported on said frame, each of said elements comprising a resilient and deflectable wire member shaped to provide an upright back rest portion having a lower end and an upper end attached to said upper rail and extending downwardly and forwardly therefrom, a forwardly extending seat portion having a rear end spaced from the lower end of said back rest portion and a front end which is positioned forwardly of and above said lower rail, supporting means integral with the front end of said seat portion and extending downwardly and rearwardly therefrom and secured to said lower rail for up and down swinging movement relative to said lower rail to provide for up and down movement of the front end of said seat portion, and a curved connecting portion integral with and extending between the rear end of said seat portion and the lower end of said back rest portion, said connecting portion curving downwardly and rearwardly from the rear end of said seat portion and thence upwardly and forwardly to the lower end of said back rest portion.

4. In a seat construction according to claim 3, wherein each of said wire spring elements has its end portions of a substantially circular cross section and an intermediate portion including said connecting portion of a substantially rectangular cross section.

References Cited in the file of this patent

UNITED STATES PATENTS

| | | |
|---|---|---|
| 1,430,249 | Morse | Sept. 26, 1922 |
| 2,203,598 | Nelems | June 4, 1940 |
| 2,371,407 | Neely | Mar. 13, 1945 |
| 2,706,519 | Kranz | Apr. 19, 1955 |
| 2,835,314 | Neely | May 20, 1958 |

FOREIGN PATENTS

| | | |
|---|---|---|
| 672,752 | Germany | Mar. 9, 1939 |
| 683,718 | Germany | Nov. 13, 1939 |
| 635,466 | Great Britain | Apr. 12, 1950 |